United States Patent [19]
Johnson et al.

[11] 3,739,634

[45] June 19, 1973

[54] APPARATUS FOR GENERATING ULTRA HIGH TOTAL ENTHALPY GASES WITH MULTICOMPONENT FLOW

[75] Inventors: Elmer G. Johnson, Fairborn; Hans P. Von Ohain, Dayton, both of Ohio

[73] Assignee: The United States of America as represented by the Secretary of the Air Force, Washington, D.C.

[22] Filed: July 6, 1972

[21] Appl. No.: 269,357

[52] U.S. Cl. ................................................. 73/147
[51] Int. Cl. ............................................ G01m 9/00
[58] Field of Search....................... 73/147; 417/197

[56] References Cited
UNITED STATES PATENTS
2,309,938   2/1943   Diserens et al. ....................... 73/147
3,029,635   4/1962   Fetz ...................................... 73/147

Primary Examiner—Donald O. Woodiel
Attorney—Harry A. Herbert, Jr. and Richard J. Killoren

[57] ABSTRACT

An apparatus for generating ultra high total enthalpy gases, having means for injecting solid or liquid particles into a flow of low molecular weight gas expanding through a high pressure ratio nozzle thereby accelerating the particles to the high speed of the low molecular weight carrier gas. At the exit of the nozzle the particles enter an additional flow of expanding low molecular weight gas of higher stagnation temperature and consequently greater speed. During this acceleration process the particles are separated from the bulk of the low molecular weight carrier gas by inertial effects. Further downstream, the kinetic energy of the particles is converted into kinetic energy of an airflow which is ducted into a test section in which re-entry flow conditions are duplicated.

9 Claims, 5 Drawing Figures

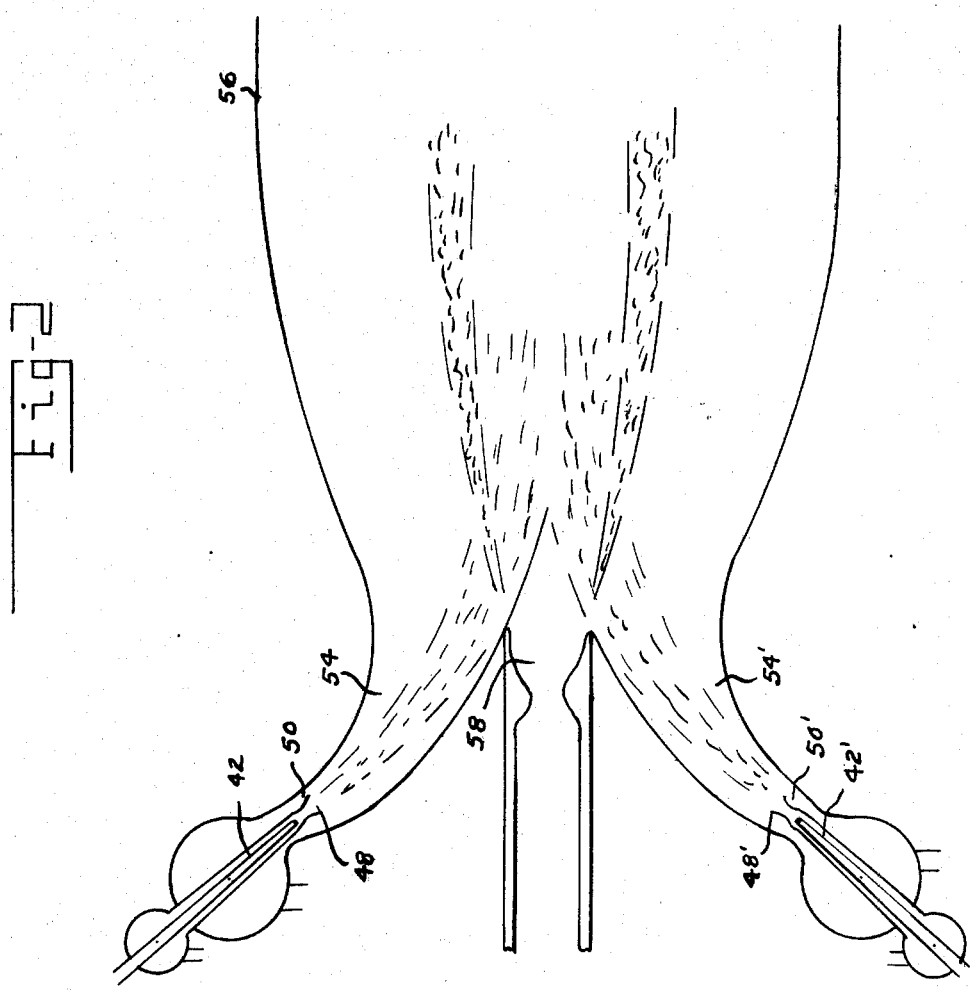

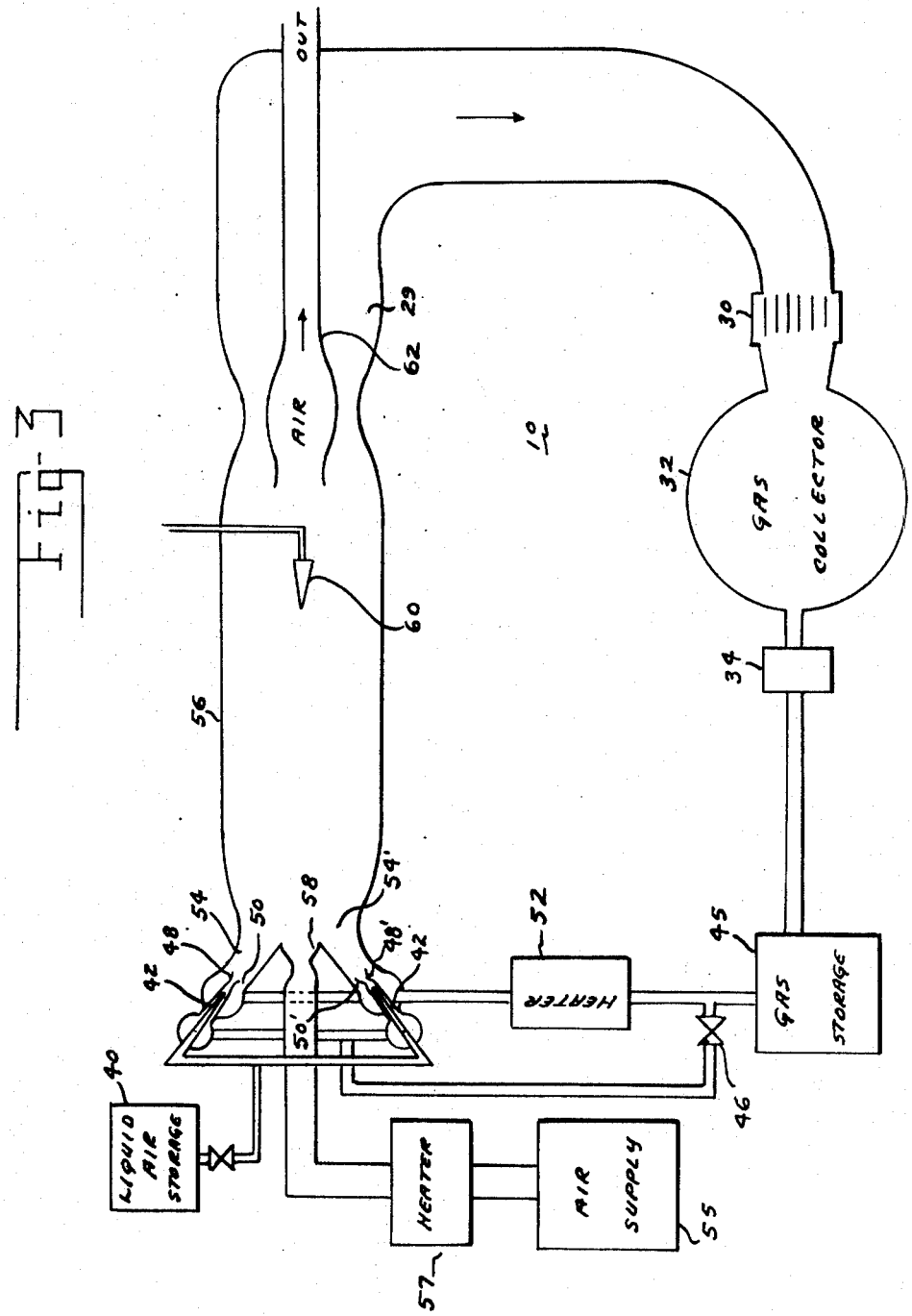

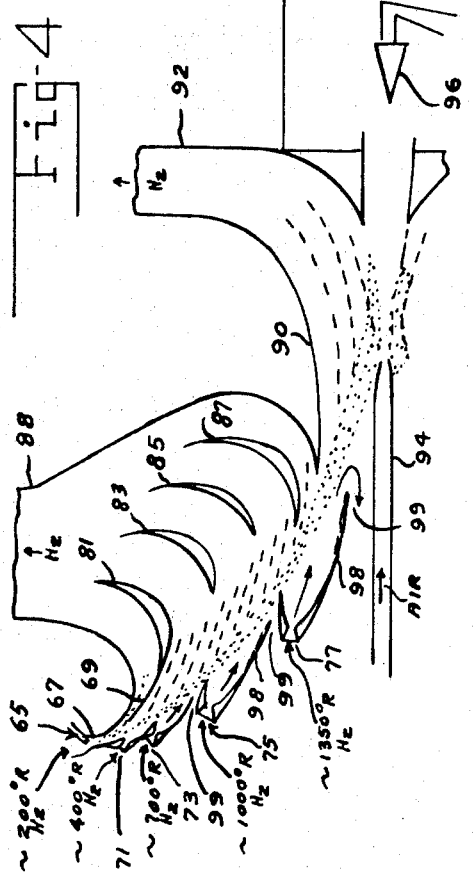
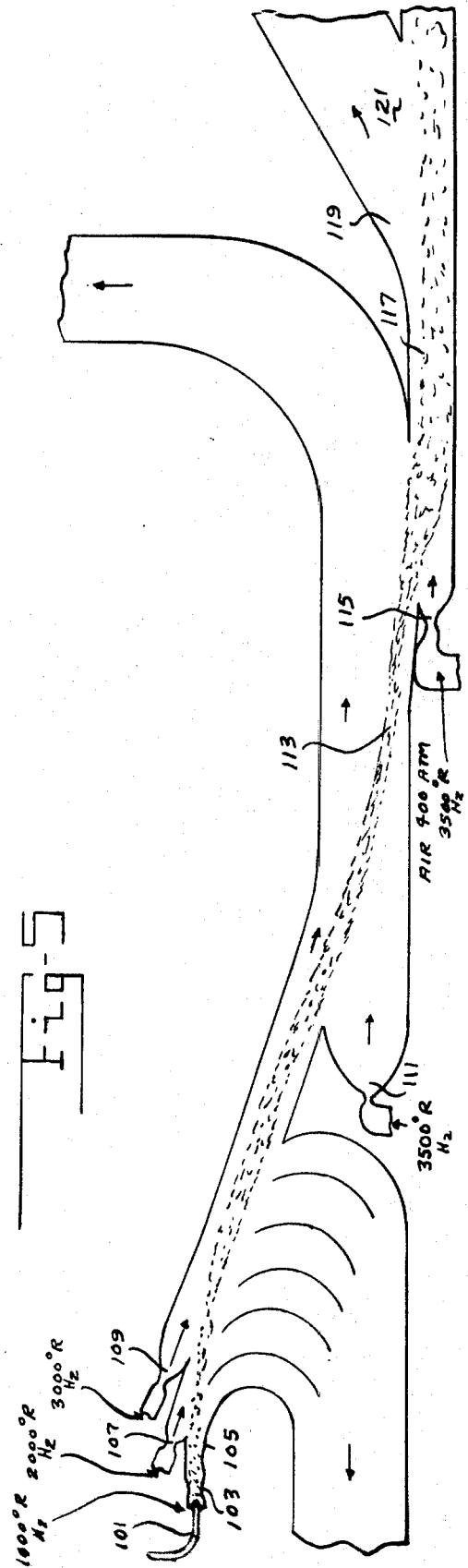

APPARATUS FOR GENERATING ULTRA HIGH TOTAL ENTHALPY GASES WITH MULTICOMPONENT FLOW

BACKGROUND OF THE INVENTION

In spite of several decades of research, hypervelocity flight environments cannot be reproduced adequately in a ground test facility. While many experimental techniques have been proposed, none of these concepts resulted in a facility having a "pure" flight duplication capability. Similarly, present day analytical approaches cannot be completely relied on to yield satisfactory solutions to many of the critical problems associated with the design, manufacture, performance evaluation or operational phases of flight systems. Serious inadequacies exist in both theories and computational methods which prevent a clear prediction of the complex interaction which occurs among systems components in the hypersonic environment. Flight testing, of course, is the more realistic way to measure performance of vehicles. However, this approach has serious drawbacks in time and costs for development of new systems, hence the more economical solution is the use of extension ground testing facilities. Ground facilities allow the designer and engineer to extend the time frame of data acquisition by orders of magnitude and study performance ranges beyond that which is normally attained in flight testing.

Some of the major deficiencies of contemporary facilities are: (1) Test times too short for many types of investigations; (2) Testing medium not representative of true atmospheric conditions due to contaminations caused by the heating or acceleration processes; i.e., residual dissociation or ionization of the test gas, or vaporization of electrodes, or other foreign materials; (3) Inability to duplicate the ultra high stagnation temperatures, pressures and real gas effects experienced by reentering vehicles, especially in the very important altitude regime from 100,000 to about 200,000 feet.

Perhaps most important of all of these is the problem of simultaneously producing the total enthalpies and pressures experienced by high-speed vehicles or missiles. Many novel concepts and approaches have been proposed and investigate which held promise of circumventing these limitations. Shock tubes, hot shot facilities, free flight test ranges, magnetic fluid dynamics power generation-acceleration, high-pressure and high-temperature arc heaters, and free flight testing methods are typical of those concepts which have been investigated and are used with partial success at the present time.

BRIEF SUMMARY OF THE INVENTION

According to this invention, an apparatus is provided to produce large quantities of gas at hypersonic speeds under conditions of extremely high stagnation pressures and temperature which has high reliability and simplicity and low operational and capital costs.

Use is made of low molecular weight gases to accelerate solid or liquified gas particles to high velocities. The apparatus uses particular arrangements and configurations of nozzles, mixing devices, inertial separators and controls to make use of the physical effects and phenomena of energy transfer occurring in multicomponent flows. In these energy transfer processes, solid or liquified gas particles are suspended in a carrier gas and are accelerated gradually to high speeds by expanding the carrier gas through a system of high pressure ratio nozzles. Thereby, a large portion of the enthalpy of the carrier gas is transferred to the suspended particles in the form of kinetic energy. After the kinetic energy of the particles is converted into kinetic energy of an airflow, this airflow can be made to undergo further acceleration by conventional expansion means. Means are provided to separate the low molecular weight gas from the particles. Downstream of the test section, the high molecular weight gas is exhausted and the low molecular weight gas may be cooled and recompressed into a storage container.

IN THE DRAWING

FIG. 2 is a schematic diagram partially in block form of an apparatus for generating ultra high total enthalpy gases according to another embodiment of the invention.

FIG. 3 is a schematic diagram of the energies mixing apparatus for the device of FIG. 2.

FIG. 4 is a schematic diagram showing a modified energies mixing apparatus according to another embodiment of the invention.

FIG. 5 is a schematic diagram partially in block form showing an apparatus for generating ultra high total enthalpy gases according to a further embodiment of the invention.

DETAILED DESCRIPTION OF THE INVENTION

Figure 1:
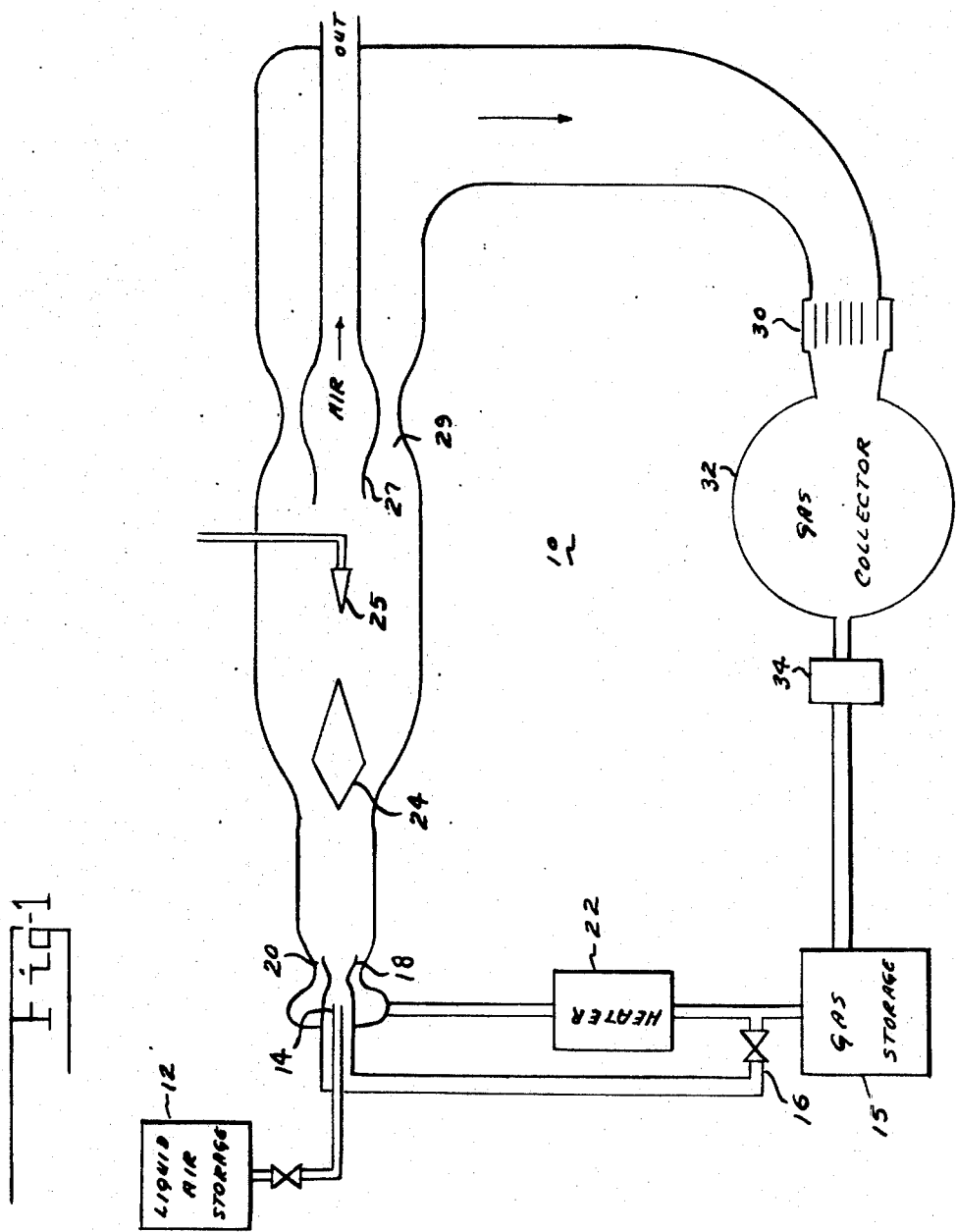
FIG. 1 is a schematic diagram partially in block form of an apparatus for generating ultra high total anthalpy gases according to the invention.

Referring now to FIG. 1 of the drawing, reference number 10 shows a multicomponent flow system in which liquid air from tank 12 is supplied to spray nozzle 14. A cold carrier gas from supply 15 is supplied through a modulating valve 16 to an expanding nozzle 18. The liquid air droplets are entrained in the cold carrier gas flow within nozzle 18. These droplets are accelerated to the high speed of the low molecular weight carrier gas which is expanded to a high speed by undergoing a high pressure ratio expansion process. It is important that the static temperature of the cold carrier gas does not exceed the temperature of the liquid air in order to avoid vaporization losses of the liquid air droplets during the mixing and acceleration phase. Under these conditions, the liquid air droplets will freeze during the expansion process in nozzle 18. An additional flow of expanding low molecular weight gas is provided in an annular nozzle 20 around nozzle 18. The additional gas has a higher stagnation temperature than that passing through nozzle 18, as a result of having passed through a heater 22. However, due to the higher expansion ratio, the static temperature of the carrier gas at the exit of nozzle 20 can be made sufficiently low so that the air particles entering the higher speed gas stream from nozzle 20 will remain frozen.

Downstream of the nozzles 18 and 20 a slender center body 24 is located in the flowstream. The center body 24 produces oblique shocks which, in turn, deflect the carrier gas flow from a straight axial flow into a slightly radial outward flow. The air particles, due to their inertial effects, tend to maintain their axial flow direction. Consequently, in the vicinity of the apex of the center body, air particles hit the surface of the center body with a finite normal velocity component. This results in a speed loss of the air particles and in their subsequent vaporization. Thus, a high speed air layer of high total and static temperature is formed around the center body. Further downstream where the diameter of the center body increases, more air particles tend to hit the surface and others will be vaporized within the hot air layer around the center body prior to reaching the surface. At the maximum diameter of the center body essentially all air particles are merged with the hot air layer around the center body. Since only a small velocity component of the air particles is converted to heat, the static temperature of the air flow around the cone is considerably below stagnation temperature. From the station of maximum diameter of the center body, the total flow cross section is increasing, a further expansion and acceleration of both gases takes place. Downstream of the center body flow fields of axial flow direction and suitable static temperature are achieved. A test device 25 is located in this region.

Air is then passed to the atmosphere through a separating duct 27 and the low molecular weight gas is collected in a duct 29 around duct 27. The low molecular weight carrier gas is cooled in a conventional cooler 30 and collected in a collector 32. The collected gas may then be recompressed by a compressor 34 and returned to storage supply 15.

In the operation of the device, liquid air is sprayed from nozzle 14 into a cold carrier gas flow of low molecular weight gas, such as hydrogen or helium. The air droplets are accelerated gradually to high speeds by expanding the low molecular weight carrier gas through high pressure ratio nozzle 18. The air droplets are then further accelerated upon entering the higher speed and higher stagnation temperature stream from nozzle 20. The low molecular weight gas is then separated from the air droplets. The high speed air droplets are then vaporized by impact of some of the particles with the center body 24 and within the hot gas layer around the center body. The gases are then further accelerated and air flow past the test device 25 and into separating duct 27. The low molecular weight gas is collected in duct 29 and cooled and recompressed for return to storage supply 15.

In the device of FIGS. 2 and 3, the center body 24 is eliminated which results in a more uniform flow field past the test device. In this device, the multicomponent flow is bent from a partially radial inward flow into an axial flow direction. By the resulting inertial force field the air droplets drift to the axis of symmetry forming a coaxial stream of ultra high speed closely spaced droplets. A high temperature air jet, having a mass flow which is small in comparison to that of the stream of liquid droplets, is injected into the central region of the stream to vaporize the air droplets.

In the device of FIGS. 2 and 3, liquid air from storage tank 40 is supplied to spray nozzles 42 and 42'. Cold carrier gas from supply 45 is supplied through modulating valve 46 to the expanding nozzles 48 and 48'. As in the device of FIG. 1, the droplets are entrained in the cold carrier gas flow within nozzles 48 and 48'. The liquid droplets then enter the higher speed gas from nozzles 50 and 50' having a higher stagnation temperature than that passing through nozzles 48 and 48' as a result of having passed through heater 52.

As a result of the bending of the flow in channels 54 and 54', the heavier liquid air droplets are centerfuged toward the axis of channel 56 and the lighter weight gas flows to the outer portion of channel 56 around the high velocity core of air.

A high temperature air jet from nozzle 58 is injected into the central portion of the air core to vaporize the air droplets.

The air with the high stagnation temperature then flows past the test specimen 60. The air is then collected in separating duct 62 and passed to the atmosphere and the low molecular weight gas is recovered as in FIG. 1.

The device of FIG. 3 may be modified in the manner as shown in FIG. 4 wherein higher and higher temperature carrier gas is introduced through a plurality of nozzles during the expansion process so that the stagnation temperature is increased while the static temperature is kept below the particle vaporization temperature.

The liquid air is introduced in spray nozzle 65. During expansion through nozzle 67 the droplets are frozen, thus maintaining their size during subsequent acceleration. In the curve nozzle 67, the larger particles drift further away from the center of curvature than the smaller particles. Thus, by means of a splitter plate 69, the smaller particles can be screened out to provide a flow of droplets of more uniform size. Thus, a more uniform acceleration of the particles by the carrier gas admitted through nozzles 71, 73, 75 and 77 is provided. After the hydrogen gas passes through the air particles, it enters the space between vanes 81, 83, 85 and 87 and passes to the recovery system through exhaust 88.

The hydrogen gas entering central region 90 is exhausted at 92. The liquid air particles pass axially along region 90 and are vaporized by hot gas from nozzle 94 as in FIG. 2. The high stagnation temperature gas is then directed past test apparatus 96 as in FIGS. 2 and 3. The hydrogen gas is recovered as in FIG. 1.

Relatively thick boundary layers 98 are formed on the wall of the injection nozzles. It is necessary to prevent air particles from entering these boundary layers in order to prevent deceleration and premature vaporization. For this reason, the boundary layers are removed through channels 99 as shown.

Although vaporization of the air particles has been described as being accomplished by impact with a center body and by supplying high temperature air thereto other means may also be used such as by the use of high energy electromagnetic radiation, e.g., a laser beam.

In FIG. 5 an apparatus in which high refractory particles, metal oxides such as hafnium oxide, are injected through injection means 101 into a low molecular weight carrier gas and accelerated by expanding the carrier gas through nozzle 103 which is slightly curved as at 105 to achieve a crude particle-gas separation effect. The particles enter an additional low molecular weight carrier gas flow of increasingly higher speed and total temperature issuing from nozzles 107 to 109 in a similar fashion as shown in FIG. 4. However, in contrast to FIG. 4, the nozzle admission side relative to the particle stream changes, which is indicated by the location of the last admission nozzle 111. The significance of this admission method is that downstream from the last admission nozzle 111 a particle focussing effect in the region indicated at 113 is produced. The slower moving particles of one nozzle system becomes the faster moving particles of the subsequent system. The particles follow a slight S-shaped path. The high speed concentrated particle stream enters the airstream issuing from nozzle 115. After subsequent momentum exchange between the particles and the air stream in region 117 the speed and static temperature of the air is greatly increased. The total enthalpy values of the air may range from about 5000 btu/lb to 10,000 btu/lb, and stagnation pressures may be of the order of 5000 atm and higher corresponding to re-entry conditions at altitudes of about 150,000 feet.

After the momentum exchange is completed the air is expanded by a Prandtl-Meir type expansion nozzle 119 to the test section, such as shown in FIGS. 1, 3 and 4, located downstream from the particle and air separation region 121. The flow curvature associated with this air expansion is much stronger than that of the particles. Consequently a major portion of the air is completely free of particles and expanded into the test section. A relatively small portion of the air exits with the particles.

The kinetic energy of the particles can be used for precompression of the air to be ducted into nozzle 115 (by means not shown in the figure) or can be used for recompressing the low molecular working medium. The particles, after slowed down, are recycled into the system and readmitted through nozzle 101.

There is thus achieved a system for providing ultra high total enthalpy gases.

We claim:

1. An apparatus for generating ultra high total enthalpy gases, comprising: a high pressure ratio expansion nozzle; means for supplying a low molecular weight gas to said expansion nozzle to thereby expand the low molecular weight gas to a high speed; means for introducing particles into the flow of low molecular weight gas whereby the particles are accelerated to the high speeds of the low molecular weight gas; means for separating the low molecular weight gas from the particles, to thereby provide a separate high energy particle stream; means for converting the high energy particle stream to a high energy air stream; means for supporting a test apparatus in the air stream and means for recovering the low molecular weight gas.

2. The device as recited in claim 1 including means for introducing a high pressure, high temperature low molecular weight gas to said gas and particle stream at the exit of said high pressure ratio nozzle for further accelerating the particles.

3. The device as recited in claim 2 wherein the means for introducing high pressure, high temperature air comprises a plurality of nozzles positioned along the gas and particle stream with the temperature of the gas from each nozzle being higher than the preceding nozzles along the stream.

4. The device as recited in claim 3 wherein said particles comprise solid refractory material and said means for converting the high energy particle stream to a high energy air stream comprises stream downstream of said low molecular weight gas and particle separating means; means for supplying high temperature air to the particle stream in said mixing section; means for separting the air from the particles in the output of said mixing section and for directing the air toward said test apparatus.

5. The device as recited in claim 4 wherein at least the last of said plurality of nozzles along the direction of flow is on the opposite side of the gas and particle stream from the first of said plurality of nozzles whereby the particle of said stream are subjected to a focusing effect.

6. The device as recited in claim 3 wherein said particles comprise a spray of liquid air droplets and said means for converting the high energy particle stream to a high energy air stream comprises means for vaporizing the liquid air droplets.

7. The device as recited in claim 6 wherein a center body is positioned in the flow stream of the low molecular weight gas and the particles whereby the low molecular weight gas is turned by oblique shocks from said center body and whereby the liquid air particles are vaporized by impact with the center body and by heating effects around the center body.

8. The device as recited in claim 6 wherein the low molecular weight gas and particle stream are directed along two opposing curved paths to mix in a central chamber whereby the particles are centrifuged to the center of the central chamber; said means for vaporizing the liquid air droplets comprising a high temperature air stream directed into the particle stream in the central chamber.

9. The device as recited in claim 6 wherein said high pressure ratio nozzle is curved in the direction of flow; means adjacent the smaller radius of curvature of said nozzle for screening out smaller particles from the flow.

* * * * *